United States Patent [19]
Sundman

[11] Patent Number: 5,449,256

[45] Date of Patent: Sep. 12, 1995

[54] MILL SUITABLE FOR USE IN AN OFFICE ENVIRONMENT

[75] Inventor: Arjen Sundman, Santa Cruz, Calif.

[73] Assignee: Amfit, Santa Clara, Calif.

[21] Appl. No.: 937,803

[22] Filed: Aug. 28, 1992

[51] Int. Cl.$^6$ .............................................. B23C 9/00
[52] U.S. Cl. ................... 409/134; 29/DIG. 56; 74/608; 408/710
[58] Field of Search ....... 409/134; 29/33 P, DIG. 56; 51/268; 414/223, 222; 408/241 G, 710; 74/608, 614; 451/906, 451, 453

[56] References Cited

U.S. PATENT DOCUMENTS

| | | | |
|---|---|---|---|
| 2,322,129 | 6/1943 | Hawkins | 409/134 |
| 4,514,936 | 5/1985 | Hurtado | 408/241.6 X |
| 4,842,455 | 6/1989 | Winkler et al. | 409/134 |
| 4,928,439 | 5/1990 | Ramos et al. | 409/127 X |
| 4,955,770 | 9/1990 | Kitamudd | 409/134 |
| 5,181,898 | 1/1993 | Piotrowski | 409/134 X |
| 5,217,335 | 6/1993 | Houchens, Jr. et al. | 409/134 |

FOREIGN PATENT DOCUMENTS 295107  12/1988  Japan .................... 409/134

*Primary Examiner*—William Briggs
*Attorney, Agent, or Firm*—John A. Frazzini

[57] ABSTRACT

A mill suitable for use in an office environment because is constructed to collect particulates produced by the milling process without producing an undue amount of noise by this collection process. An isolation wall substantially eliminates particulate flow from the milling cavity into a motor/control cavity. A positive-pressure air flow through the motor/control cavity further reduces particulate transfer from the milling cavity into the motor/control cavity and draws these particulates into a particulate collection tray.

12 Claims, 6 Drawing Sheets

MILL SUITABLE FOR USE IN AN OFFICE ENVIRONMENT

FIELD OF THE INVENTION

This invention relates in general to mills and relates more particularly to a mill suitable for producing insoles on-site within a medical, osteopathic, or chiropractic practitioner's office.

CONVENTION REGARDING REFERENCE NUMERALS

In the figures, each element indicated by a reference numeral will be indicated by the same reference numeral in every figure in which that element appears. The first digit of any reference numeral indicates the first figure in which its associated element is presented.

BACKGROUND OF THE INVENTION

In the past decade or so, medical, osteopathic and chiropractic practitioners have recognized the widespread need for insoles that are specially adapted to correct various physical problems, such as foot problems or those back problems that can be produced or aggravated by an inequality in the lengths of a person's legs. Generic orthotics have been available, which a person can utilize on a trial and error basis to seek optimal benefit. Because this approach tends to be fairly unsuccessful, the demand for custom-made orthotics has increased significantly.

In one class of custom-made orthotics, molds are produced of each of a person's feet and each orthotic is molded to fit the bottom contour of the corresponding one of that person's :feet. This bottom contour and average thickness of the orthotic are selected to produce the desired medical, osteopathic and physical benefits to the patient. Such a molding process can take a couple of hours or more and the turn-around time to provide the patient with the custom-made orthotic can be a few weeks.

In order to reduce the time needed to produce custom-made orthotics, AMFIT Inc. developed a foot contour measurement machine, called the Footfax Scanner TM, that includes an array of parallel pins that can each be displaced longitudinally, such that, when a person's foot is pressed into contact with a top side of this array of pins, the longitudinal displacements measure the contour of that person's foot. AMFIT also developed an associated mill that utilizes this contour data to mill a custom-made orthotic from an orthotic blank. Such an orthotic blank is of a material, such as ethyl vinyl acetate (EVA), that is usually slightly compressible, but rigid enough to provide the desired foot support.

In one embodiment of these two machines, the mill is large and noisy and is therefore located in a manufacturing facility that receives the contour information about a particular patient's foot and fabricates the desired orthotic. Although each of these machines is much more efficient than those in earlier orthotic manufacturing processes, there is still an inherent time lag involved whenever the orthotic is manufactured at a site remote from the medical, osteopathic or chiropractic practitioner. It would therefore be advantageous to have an orthotic manufacturing system that can be located on-site at or near the offices of a group of such practitioners.

The AMFIT model 30XX mill was developed for this use. This machine is about four and a half feet tall and has a base that is approximately three feet by three feet. The orthotic blank is mounted vertically (i.e., with that surface, that is to be milled to fit a patient's foot, having its normal oriented vertically). The orthotic blank is moved in an X-Y plane and the milling head moved in a Z-direction to generate the desired contour in a top surface of the orthotic blank. Unfortunately, the particulates, that are produced in tremendous quantities as a necessary by-product of this process, need to be gathered continuously to facilitate throughput. This has required the inclusion of a vacuum system, similar to the shop vacs that are readily available commercially, to draw these particulates away from the orthotic blank and collect them for disposal. Unfortunately, such systems are much noisier than is desired for the environment of a medical, osteopathic or chiropractic practitioner.

It would therefore be advantageous to have a mill that is suitable for use in any of these environments. Such a machine must be quiet and preferably is small enough that it can be used in a room of the size typical of medical suites without requiring the dedication of that room to this single machine.

These noise and size problems for a mill have not arisen previously, because mills were typically located in an industrial environment in which particulates are not collected, but are instead spewed at will onto the mill and the factory floor adjacent to that machine. When the amount of such particulates becomes sufficient to be bothersome, the machinist typically uses a hand broom or air hose to brush or blow the particulates off of the machine onto the floor and then, when the floor is sufficiently covered to be bothersome, to sweep those particulates up and discard them. In general, there hasn't been a need for a quiet mill suitable for use in the quiet, clean environment characteristic of a doctor's office.

SUMMARY OF THE INVENTION

In accordance with the illustrated preferred embodiment, a mill is presented that is suitable for use in fabricating orthotics on-site in a doctor's office or suite of offices. In one embodiment, the size has been reduced to a volume that is approximately 43 cm×74 cm×45 cm. In order to reduce noise significantly, the machine is adapted to process the orthotic blank in an orientation in which the surface being milled is oriented horizontally (i.e., the normal to this surface is oriented substantially parallel to the ground). This orientation alone substantially reduces the noise produced by a particulate collection system, because it utilizes gravity to direct such particulates toward a particulate collection drawer. This contrasts with the prior AMFIT mill discussed above in which, because of the vertical orientation of the orthotic blank, a relatively strong vacuum system was required to draw these particulates upward against the pull of gravity and then onward to a particulate collection tray. Thus, whereas the prior embodiment had to overcome the gravitational force on these particulates in order to collect these particulates, the new system utilizes the gravitational force to aid in collecting them.

Unfortunately, many of the particulates are light enough that they can drift to moving components of this mill. In particular, the mill typically includes several threaded shafts and/or belts that are used to move the milling head as needed to mill the desired contour into the orthotic blank. It also includes rails on which one or more movable stages can be translated in x-, y- and z-directions to move the milling head relative to the orthotic blank. Such particulates can interfere with the operation of such shafts, belts and rails and can also damage a motor used to drive the milling head. In particular, in an embodiment in which all three degrees of motion are produced by components in a single motor/control cavity, the milling head is located at the end of a relatively long lever arm from such rails, so that preloaded rails must be used to achieve sufficiently accurate control over the position of the milling head. Such preloaded rails are easily jammed by particulates, such as those produced during milling of an orthotic. It is therefore important to include a mechanism that keeps these particulates away from such components.

In accordance with the illustrated preferred embodiment, the milling head projects into a milling cavity in which the particulates are constrained away from a motor control cavity containing those elements that move the milling head relative to the orthotic blank. The motor is mounted on a stage that moves relative to an orthotic mount to produce the desired contour in an orthotic supported on this orthotic mount. This relative motion can be achieved by moving the orthotic, by moving the motor or by moving both to achieve the desired relative motion. For example, it can be advantageous to move the mount in an x-direction and the motor in a y-direction in order to align the milling head over any selected portion of the orthotic blank. The depth of milling can be achieved by moving the motor, by moving the orthotic and/or by moving the milling head relative to the motor (e.g., by mounting the milling head on a shaft that is extendable to produce the desired contour as the milling head is moved over the surface of the orthotic).

Preferably, all three degrees of relative motion are produced by translation of the milling head, because this enables all motors and control mechanisms to be contained in a single motor/control cavity shielded from particulates by a single, adjustable isolation wall. The milling head projects into the milling chamber through an aperture in this isolation wall.

The milling head is coupled to a cutting motor and is movable in a z-direction through the aperture to control the depth of milling of the orthotic blank. The aperture and milling head are movable in x- and y-directions parallel to a top surface of the blank to position the milling head at desired (x,y) coordinates of the orthotic blank, so that a desired contour can be produced in the top surface of this orthotic blank.

This isolation wall must substantially eliminate particulate flow from the milling cavity into the motor/control cavity while enabling 3-axis translation of the milling head. In the preferred embodiment, this is achieved by use of a drape that enables relative translation of the milling head in the X-direction and a pair of window shades that enable motion in the Y-direction, while preventing particulates from drifting into the motor/control cavity. The milling head is movable in the Z-direction through this aperture to vary the depth of cut by the milling head.

Although a pair of window shades could have also been used to prevent particulate flow into the motor/control cavity while enabling motion of the milling head in the X-direction, the simpler, less expensive drape allows the desired X-direction motion while substantially eliminating particulate flow between the milling and motor/control cavities.

Particulates cannot get back into the motor/control cavity through this aperture, because of a bellow surrounding the milling head in the region between the aperture and the milling motor. A blower directs air out of the aperture to induce particulates into free air, so that such particulates can be directed into the particulate collection system.

This arrangement requires only a modest power for such a fan, so that it will generate a level of noise comparable to the noise of fans typically used to cool modern pieces of electronic equipment, such as computers. This noise level is thus near the lower threshold of being noticed. This air flow is supplemented by one or more fans mounted on a wall of the motor control cavity to increase the positive pressure flow of air through this mill. By "positive pressure flow" is meant that a pressure slightly above ambient is produced in the motor/control cavity to assist the air flow from this cavity into the milling cavity. These fans are of the type conventionally used in electronic equipment.

In order to collect these particulates and to allow only a negligible level of particulate flow into the environment through a set of exhaust openings, the particulate collection tray includes a vertical barrier that forces the air flow path to make a U-turn in the horizontal plane. This more than doubles the average pathlength that a particulate would need to travel to pass out of a set of exhaust opening at the back of the mill, thereby significantly reducing the amount of particulates exhausted into the environment. In alternate embodiments, additional barriers can be included to increase further the pathlength of the particulates within the particulate collection tray. A filter is positioned in front of these exhaust openings in such a manner that a closed cavity is produced between this filter, the back wall of the mill and the bottom wall of the mill so that air is exhausted through all of these exhaust openings. Such positive pressure flow is typically quieter than negative pressure flow, because any turbulence produced by the fan blades is in the air within the motor control cavity and is therefore baffled by the walls of the mill.

In spite of this positive pressure flow from the motor/control cavity into the milling cavity, some particulates can flow from the milling cavity into the motor/control cavity. It is therefore advantageous to include protective sleeves that cover any exposed portions of the rails. The X- and Y-axis rails are protected from particulates by a pair of accordion sleeves and the Z-axis rail is protected from particulates by shading provided by other components that keep the dust from falling onto the Z-rail.

DESCRIPTION OF THE PREFERRED EMBODIMENT

Figure 1B:
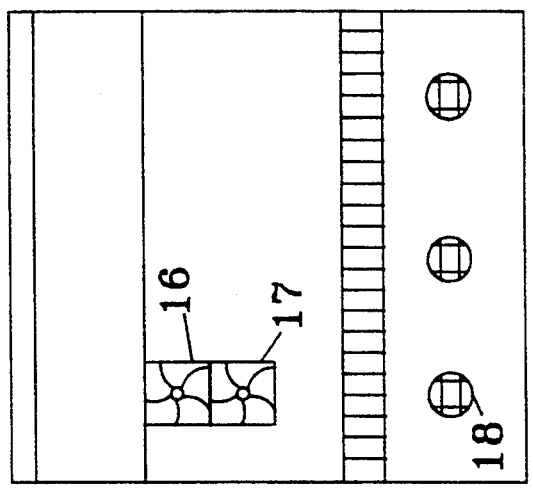
FIG. 1B is a rear view of the mill of FIG. 1A.
Figure 1A:
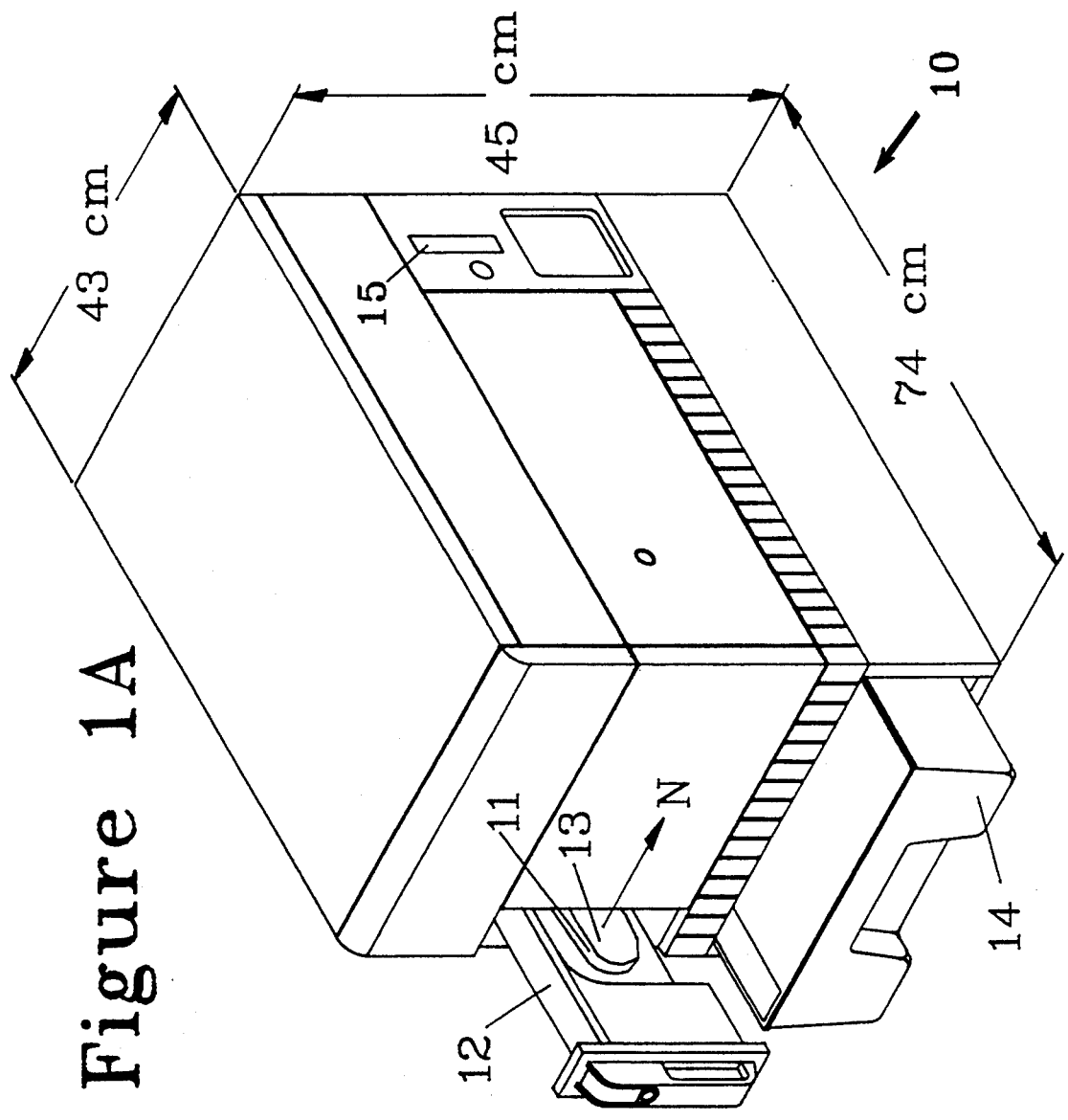
FIG. 1A an isometric view of a mill suitable for use in an office environment.

FIG. 1 is an isometric view of a mill 10 suitable for use in fabricating orthotics in an office environment. Because this mill is only 44 cm high by 74 cm long by 43 cm wide, it easily fits into a typical medical office. In addition, it includes a particulate collection system that is quiet enough that this machine can be operated without disrupting other activities in such an office. This mill can be used in conjunction with the AMFIT model 20XX foot contour measurement machine to enable a patient to be measured for and fitted with a custom-made orthotic during a single office visit.

An orthotic blank 11 of a size appropriate for a given patient is mounted on a support tray 12 in a "horizontal orientation" (i.e., an orientation in which a normal $\vec{N}$ to a top surface 13 of the orthotic blank is horizontal). To facilitate mounting the orthotic blank, this orthotic support tray is slidably attached to the remainder of this mill. When support tray 12 is fully retracted into this mill, orthotic blank 11 is accurately aligned with respect to a milling head 21 shown in FIG. 2. Particulates produced during the process of milling orthotic blank 11 are collected in a particulate collection tray 14. In response to data from the AMFIT 20XX foot contour measurement machine, this milling head is controlled in X-, Y- and Z-directions to mill the desired contour into this orthotic blank. A floppy disk can be inserted into a floppy disk drive slot 15 to transfer the contour data to the mill from a foot contour measured by a foot contour measurement machine, such as the AMFIT 20XX.

Figure 2:
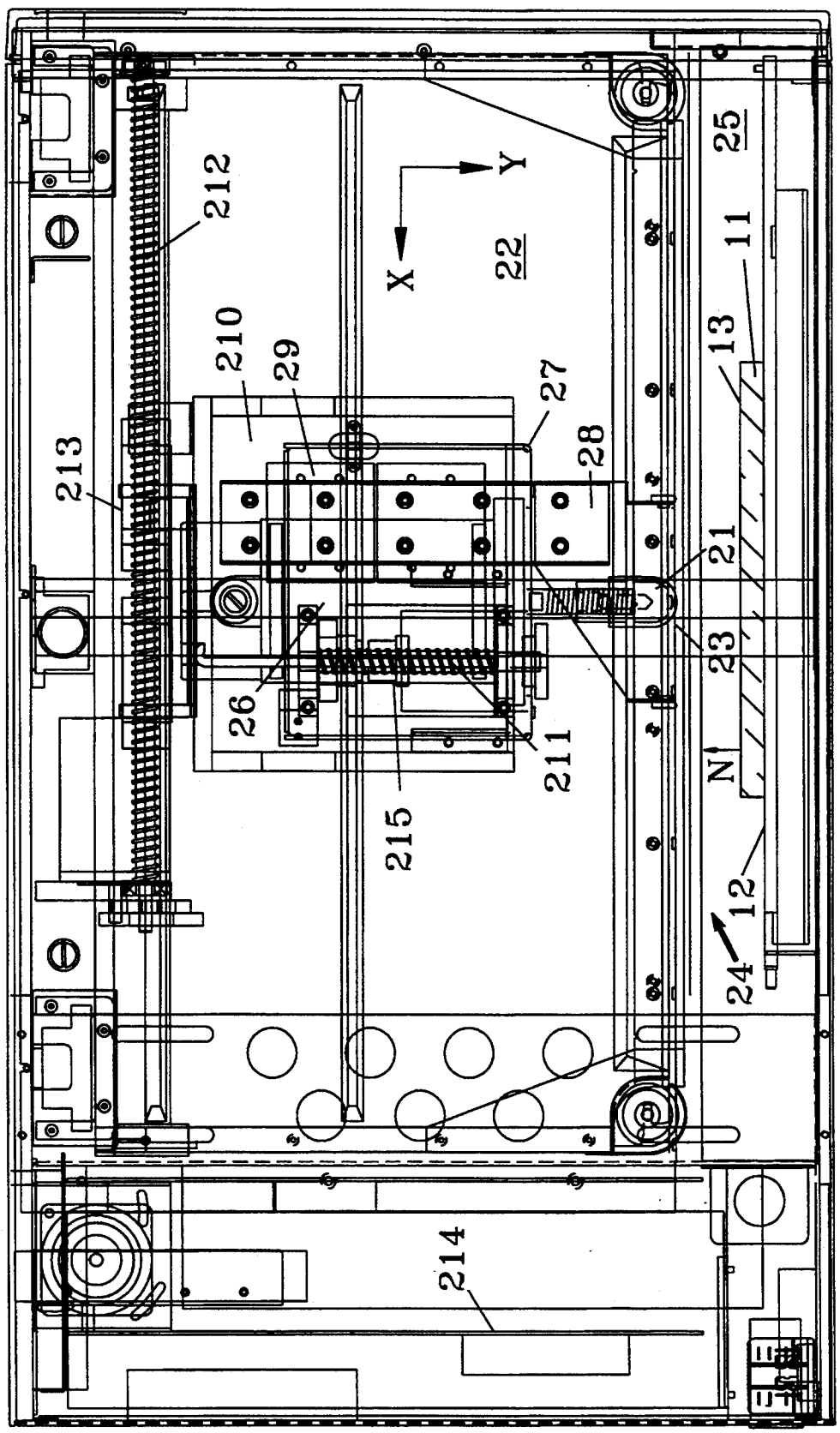
FIG. 2 is a schematic diagram of the mill of FIG. 1 illustrating the relationship of the milling head, the milling cavity and the motor/control cavity.

As shown in FIGS. 2 and 3, milling head 21 extends from a motor/control cavity 22, through an aperture 23 in an isolation wall 24 into a milling cavity 25 containing the orthotic blank and the orthotic support tray. Isolation wall 24 functions as a barrier that prevents almost all of the particulates produced in milling cavity 25 from drifting into the motor/control cavity where they could damage motors and other mechanisms that rotate the milling head and move it to produce the desired contour in the orthotic blank.

In this embodiment, all three degrees of freedom of the relative position of the milling head with respect to the orthotic blank are controlled by moving only the milling head while holding the position and orientation of the orthotic blank constant. This enables all of the position control circuitry and position control mechanisms to be located in the motor/control cavity 22 where they are protected from damage by the particulates produced in the milling cavity. This also enables such motors, control circuitry and positioning mechanisms to be located in a single motor/control cavity that is sealed off from these particulates by a single adjustable isolation wall 24.

Figure 4B:
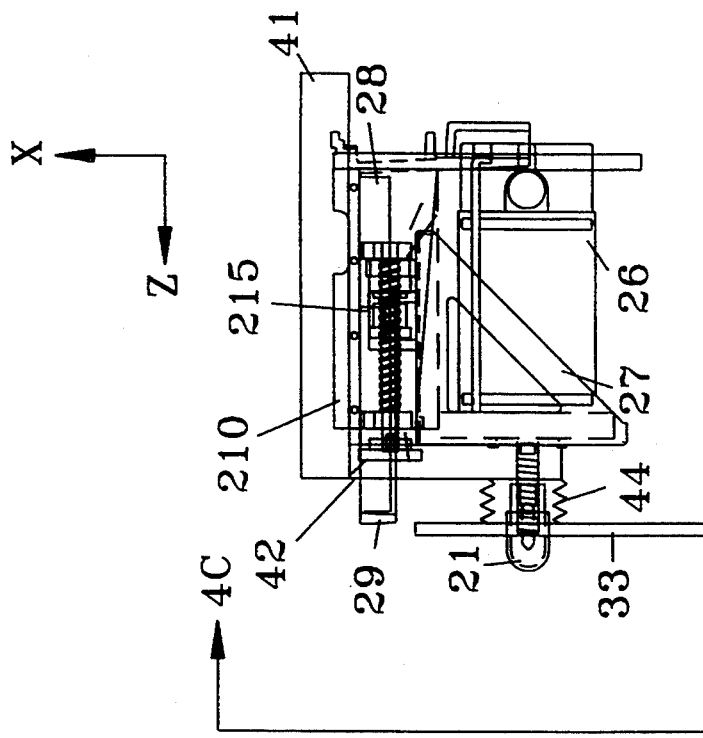
FIGS. 4A–4C are top, side and end views of the Z-stage of the mill.
Figure 4A:
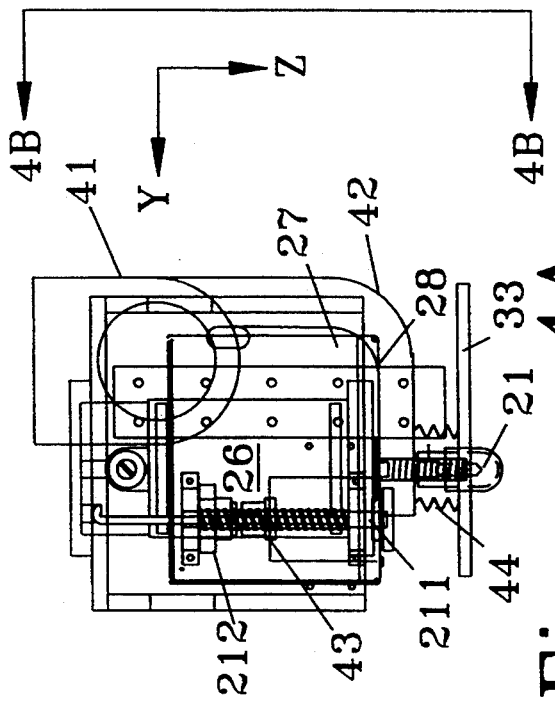
Figure 4C:
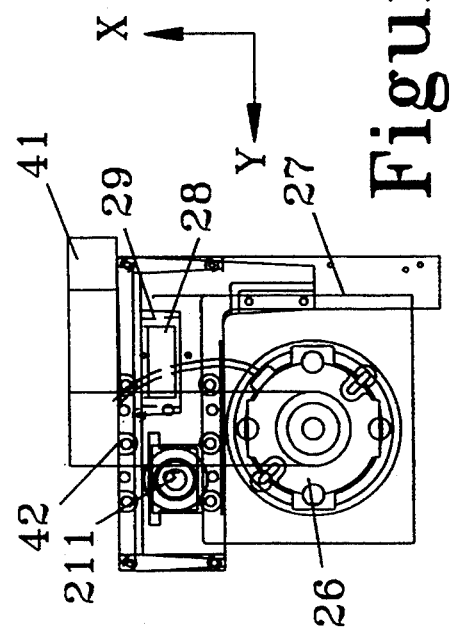

Z-directed Translation: As illustrated in FIGS. 4A–4C, milling head 21 is attached to the shaft of a cut motor 26 that is mounted on a movable Z-stage 27. This Z-stage is mounted on a Z-rail 28 that is slidably attached to a Z-rail mount 29, which is rigidly attached to a Y-stage 210. Z-rail 28 is aligned parallel to the Z-axis to enable the Z-stage to be translated in the Z-direction to vary the Z-coordinate of the milling head.

Figure 5C:
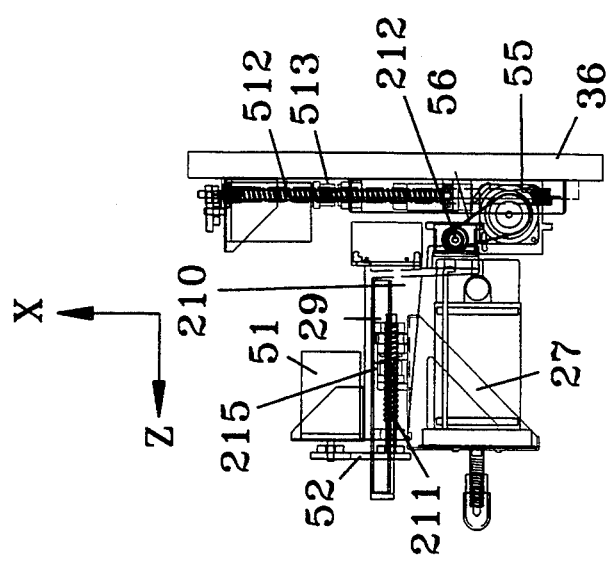
FIGS. 5A–5C are top, side and end views of the X- and Y-stages of the mill.
Figure 5A:
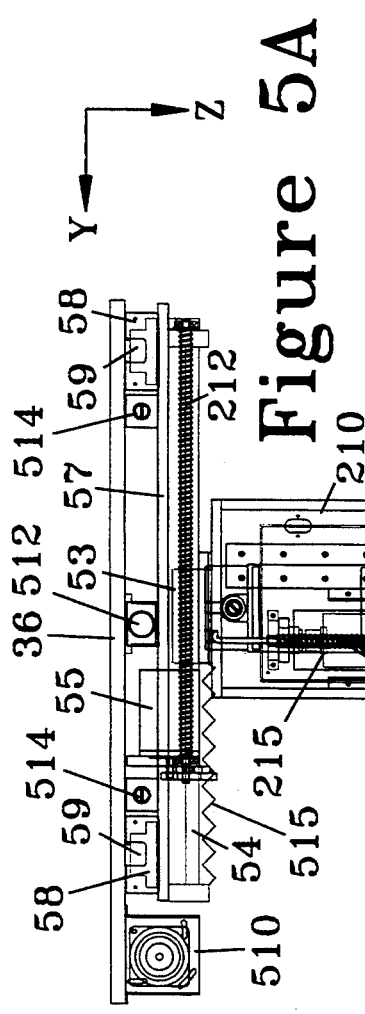
Figure 5B:
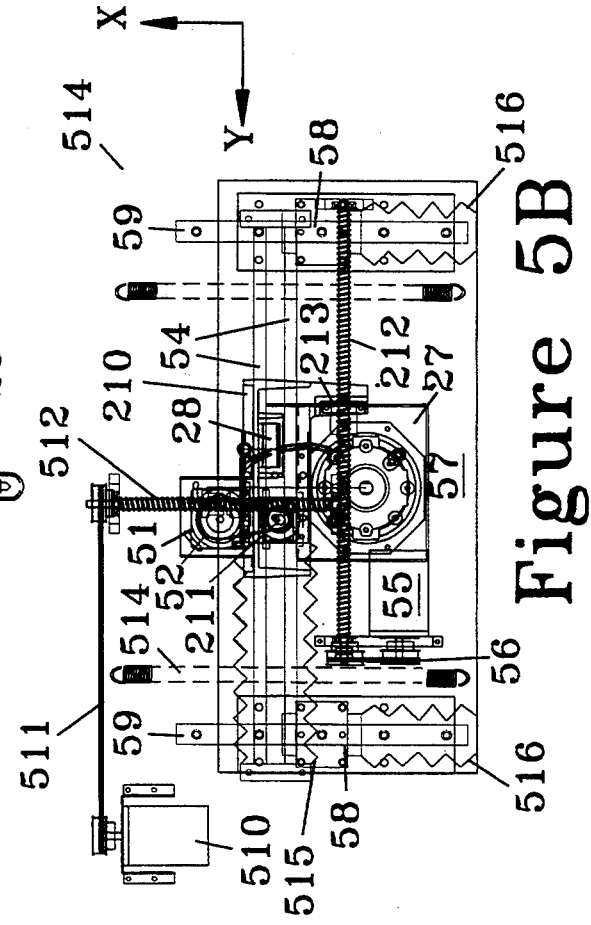

As shown in FIGS. 5A–5C, Z-directed translation of the milling head is produced by a Z-motor 51 that is connected by a Z-belt 52 to Z-screw 211. The Z-screw is rotatably engaged with a Z-supernut 215 that is rigidly attached to the Y-stage, so that, when the Z-screw is rotated a controlled amount by the Z-motor, the Z-stage is translated a controlled amount in the Z-direction.

Y-directed Translation: Y-stage 210 is rigidly attached to a Y-rail mount 53 that is slidably mounted on a Y-rail 54. Y-rail 54 is aligned parallel to the Y-axis to enable the Y-stage to be translated in the Y-direction to vary the Y-coordinate of the milling head.

Y-directed translation of the milling head is produced by a Y-motor 55 that is connected by a Y-belt 56 to Y-screw 212. The X-screw is rotatably engaged with a Y-supernut 213 that is rigidly attached to Y-stage 210, so that, when the Y-screw is rotated a controlled amount by the Y-motor, the Y-stage is translated a controlled amount in the Y-direction.

X-directed Translation: The pair of Y-rails 54 are rigidly attached to an X-stage 57, which is rigidly attached to a pair of X-mounts 58 that are each slidably mounted on an associated X-rail 59. X-rails 59 are each mounted on an enclosure wall 36 and are aligned parallel to the X-axis to enable the XY-plate to be translated in the X-direction to vary the X-coordinate of the milling head.

X-directed translation of the milling head is produced by an X-motor 510 that is connected by an X-belt 511 to an X-screw 512. The Y-screw is rotatably engaged with a X-supernut 513 that is rigidly attached to a mill enclosure wall 36 so that, when the X-screw is rotated a controlled amount by the X-motor, the X-stage is translated a controlled amount in the X-direction. In order to reduce the amount of torque required of the X-motor, a pair of springs 514 are attached between the X-stage and the mill enclosure partially counterbalance gravitational attraction of the X-, Y- and Z-stages. The stiffness of these springs is such that, at the midpoint of the Y-coordinate range of the milling head, these springs substantially support the X-stage and components mounted thereon.

Because of the relatively large lever arms and associated torque produced by these components at the pair of X-rails, two rails are utilized instead of a single rail as is used for Z-directed translation. In addition, because of the particularly large torque about an axis parallel to the pair of Y-rails, the X-rails 59 and the Y-rail 54 is preloaded to provide sufficient stiffness that the rotational play about this axis is less than one degree. This degree of stiffness is needed so that the approximately 30 cm lever arm between this rotational axis and the tip of the milling head does not produce an intolerable amount of imprecision in the milling of the orthotic blank.

Such preloaded rails 54 and 59 can easily jam if a significant number of particulates drift from the milling cavity 25 to such rails. Therefore, rails 54 and 59 are each shielded by a 3-sided accordion sleeve 515 and 516, respectively that cover those portions of these rails that are not covered at any given time by a mating component on the X- or Y-stage. The open side of each of these accordion sleeves makes a sliding contact with the element on which its associated rail is attached, thereby providing some protection against particulates.

However, because a mill is a tremendously efficient particulate generator, it is crucially important to prevent substantially all of these generated particulates from drifting from milling cavity 25 into the motor/control cavity 22. The primary protection for the motor/control components is provided by the adjustable isolation wall 24 between the milling cavity 25 and the motor/control cavity 22.

Figure 3A:
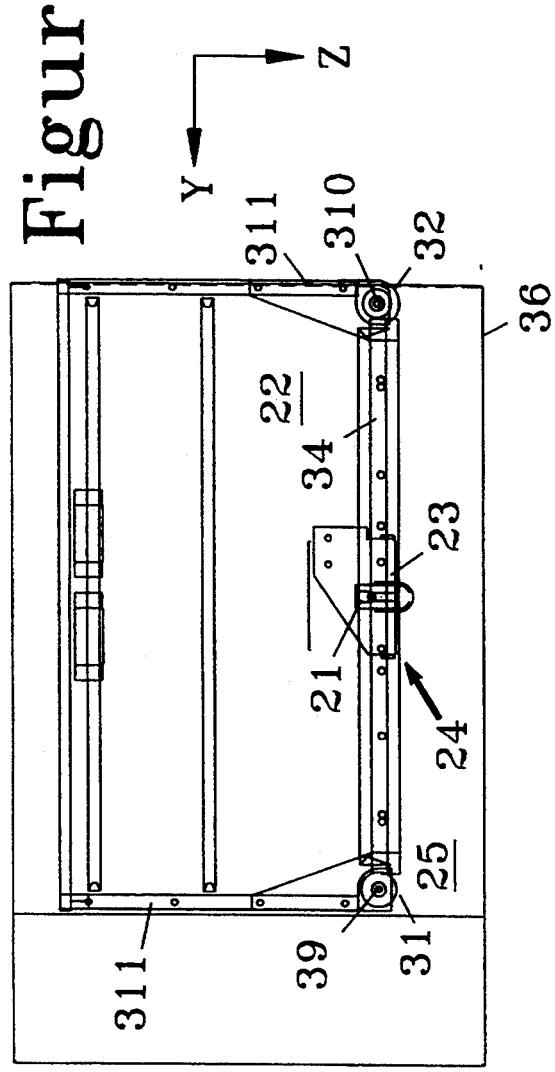
FIGS. 3A–3C are top, side and end views, respectively of the adjustable isolation wall between the motor/control cavity and the milling cavity.
Figure 3C:
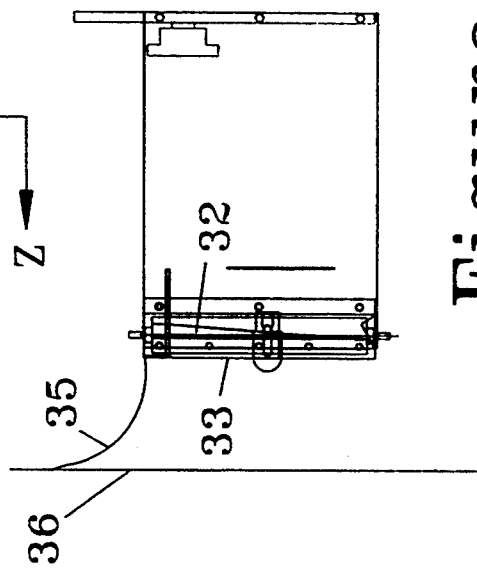
Figure 3B:
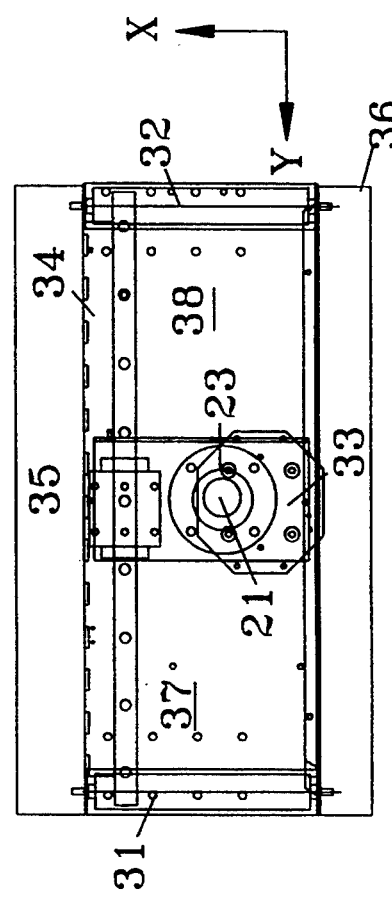

This isolation wall, best illustrated in FIGS. 3A–3C, is formed by a first roller shade 31, a second roller shade 32, an aperture plate 33, an L-bracket 34 and a flexible rubber drape 35. This drape substantially seals the top end of the milling cavity while allowing X-directed translation of the X-stage and milling head 21 relative to enclosure wall 36 and orthotic blank 11. Plate 33 is attached to the Y-stage so that Y-directed translation of the Y-stage produces an equivalent Y-directed translation of milling head 21 and plate 33.

As in the case of conventional roller shades used to cover windows, in roller shades 31 and 32, sheets 37 and 38 of flexible rubber fabric are each attached to an associated roller 39 and 310 that are each biased by an associated torsional spring to retract its associated sheet onto that roller. Because of this, as aperture plate 33 is translated in the positive Y-direction, the torsional spring in roller shade 31 retracts rubber sheet 37 onto its roller 38 and a rubber sheet 39 is pulled off of window shade roller 32. Conversely, as aperture plate 33 is translated in the negative Y-direction, the torsional spring in roller shade 32 retracts rubber sheet 39 its roller 310 and rubber sheet 37 is pulled off of window shade roller 32. When the Z-stage is translated in the Z-direction, the distance that milling head 21 extends through aperture 32 is varied, thereby changing the depth of milling of orthotic blank 11. L-bracket 34 and window shade rollers 31 and 32 are mounted on aluminum brackets 311, which are in turn rigidly attached to enclosure wall 36.

In order to substantially eliminate the flow of particulates from the milling cavity 25 into the motor/control cavity 22, a squirrel cage fan 41 (shown in FIGS. 4A–4C), mounted on Z-stage 27, is connected by an air conduit 42 to aperture plate 33 at aperture 23 to produce a flow of air from motor/control cavity 31 into milling cavity 25 to oppose diffusion of particulates from the milling cavity into the motor/control cavity. In addition, a pair of fans 16 and 17 (shown in FIG. 1) mounted on the back wall of enclosure wall 36 of the mill, in combination with fan 41 produce an air flow of 0.13 m$^3$/s through aperture 23 when milling operations are in progress. This produces a velocity of air flow through this aperture sufficient to substantially eliminate particulate flux from the milling cavity into the motor/control cavity. When no milling is in progress, only fan 16 is activated to produce an air flow of 0.03 m$^3$/s through the milling cavity to cool electronic processing circuitry 214 that controls the milling process.

Within the milling cavity, because the orthotic blank is oriented horizontally, particulates produced at top surface 13 of orthotic blank 11 will fall away from this surface by gravitational attraction. This avoids the need for a powerful vacuum system to draw such particulates upward away from the orthotic blank as is the case in the prior orthotic mill discussed in the Background of the Invention.

The bottom of the milling cavity is located over an opening in a particulate collection tray 14, so that these particulates will be directed by the gravitational force into the tray that is to collect such particulates. This opening is slightly larger than the bottom horizontal cross-section of the milling cavity, so that substantially all of these particulates falling downward will pass into the interior of this tray.

Figure 6:
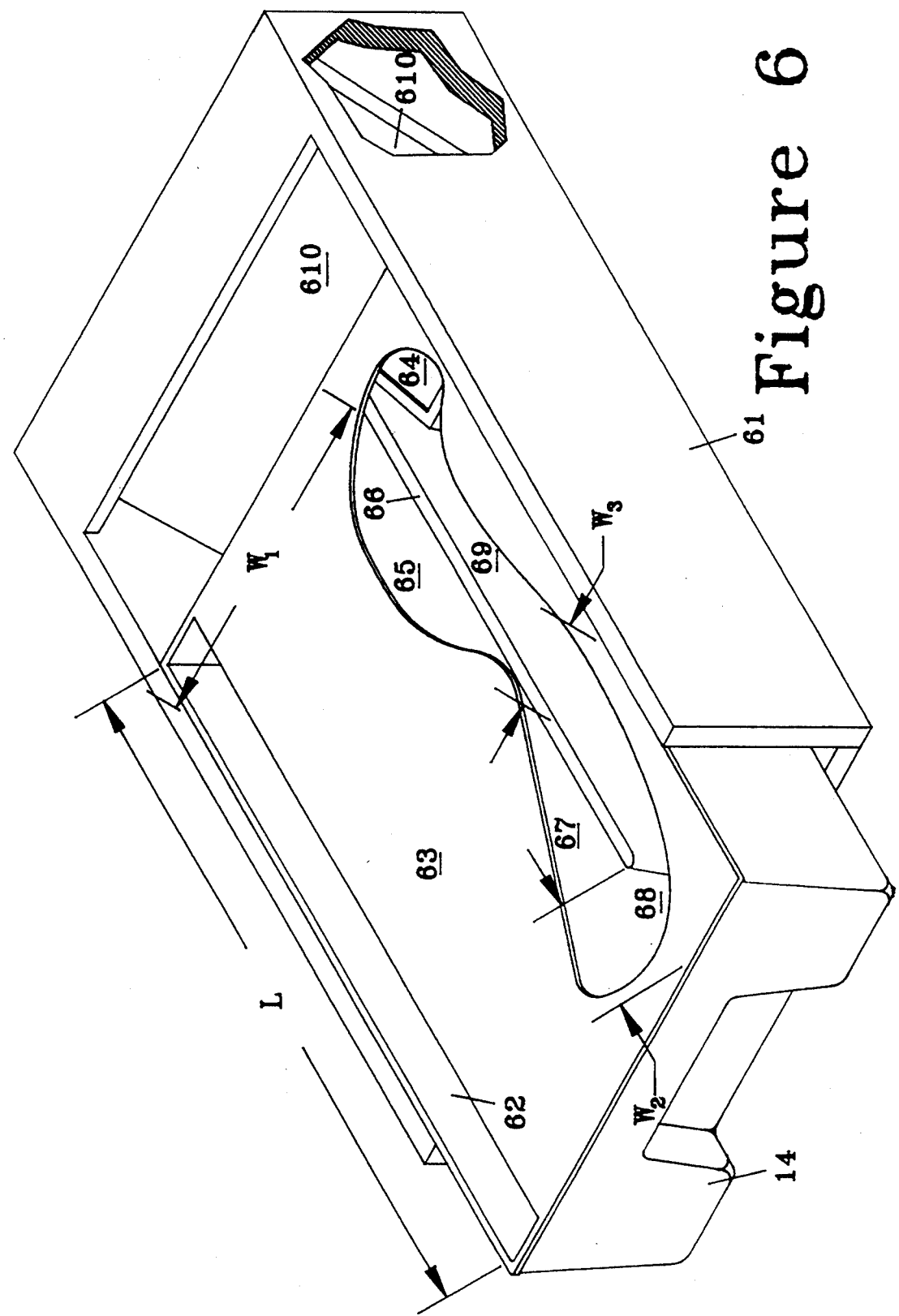
FIG. 6 is an isometric view of the particulate collection tray.

The structure of the particulate collection system is illustrated in FIGS. 6 and 1B. A removable particulate collection tray 14 is inserted into a housing 61 to collect the particulates produced by the mill. Particulate collection tray 14 is a sealed enclosure having a slot opening 62 in a top 63 and an exhaust opening 64 at a lower right rear corner of this tray. The internal structure of this tray is illustrated through a pair of cutouts in the top and right side of this tray. Inside tray 14 is a chamber 65 separated by a baffle 66 into channels 67–69 that provide a U-shaped path for air and particulates through tray 14.

The vast majority of particulates in the air stream emanating from the mill are deposited in portion 67 of chamber 65. The lighter particles that are still in the air stream are forced through channel 68 around baffle 66 and then along channel 69. This increases the pathlength of particulate flow through particulate collection tray 14, thereby providing more time for the particulates to drop to the bottom of this tray before this air stream passes out of the particulate collection tray. After this airstream exits from tray 14 via exhaust opening 64, it passes through a filter 610. This filter prevents any remaining particulates from leaving the particulate collection system. After passing through this filter, the air stream exits through exhaust ports 18 (illustrated in FIG. 1B). This arrangement enables the air stream to pass through all portions of the filter and then exit through all three exhaust openings 18, thereby reducing the maximum air velocity out of any of these exhaust openings. This structure provides a relatively low resistance exhaust path that utilizes this filter to prevent particulates from being exhausted through the exhaust into the environment.

Because the velocity of air flow through each of channels 67-69 is inversely proportional the width of each of these channels, the velocity of air flow through channel 67 is a fraction $W_2/W_1$ of the velocity of air flow in channel 68 and is a fraction $W_3/W_1$ of the velocity of air flow in channel 69. Thus, the inclusion of baffle 66 ensures that the pathlength of all particulates through tray 14 is between L and 2L instead of between 0 and L as would be the case without this barrier. This has the benefit of providing a longer path over which the particulates can settle out of this air stream before this airstream passes out of tray 14 through exhaust openings 18.

The placement of this barrier such that $W_1$ is much larger than both $W_2$ and $W_3$ ensures that the air stream velocity is much less in the first channel 67 than in the second channel 68 or in the third channel 69. Both the increased length of the path of particulates through this tray, because of the presence of this barrier 63 and the choices that $W_1 >> W_2$ and $W_1 >> W_3$, increase the likelihood that the particulates will settle out of this airstream within channel 67. The increased width of channel 67, compared to channels 68 and 69, provides an increased particulate collection volume in channel 67, where it is desired that the particulates settle onto the bottom of the tray. Typical values for $W_1$, $W_2$, and $W_3$ are 21 cm, 7 cm and 7 cm, respectively.

I claim:
1. A mill comprising:
   a milling head;
   a cut motor, connected to the milling head to move said milling head in a manner that it will mill a workpiece with which it is brought into contact;

a workpiece support, adapted to hold said workpiece in a position and orientation such that said milling head can be brought into contact with a vertical surface of said workpiece to mill a controlled contour into said vertical surface of said workpiece;

means for controllably moving said milling head relative to said workpiece support to mill a controlled contour into said vertical surface of said workpiece;

an enclosure wall enclosing a volume containing at least said milling head and said workpiece support;

an isolation wall separating a milling cavity, containing the workpiece support, from a motor/control cavity containing said means for controllably moving said milling head, said isolation wall having an aperture through which milling head protrudes into the milling cavity; and a first fan that draws ambient air into the motor/control cavity to produce an above-ambient pressure in the motor/control cavity to produce a flux of air through said aperture into the milling cavity, whereby substantially preventing particulate flow from the milling cavity through this aperture into the motor/control cavity.

2. A mill as in claim 1 further comprising:

a second fan that draws ambient air into the motor/control cavity; and means, responsive to operation of said cut motor, for controlling said first and second fans such that said first and second fans both operate only when said cut motor is activated.

3. A mill comprising:

a milling head;

a cut motor, connected to the milling head to move said milling head in a manner that it will mill a workpiece with which it is brought into contact;

a workpiece support, adapted to hold said workpiece in a position and orientation such that said milling head can be brought into contact with a vertical surface of said workpiece to mill a controlled contour into said vertical surface of said workpiece;

means for controllably moving said milling head relative to said workpiece support to mill a controlled contour into said vertical surface of said workpiece;

an enclosure wall enclosing a volume containing at least said milling head and said workpiece support;

an isolation wall separating a milling cavity, containing the workpiece support, from a motor/control cavity containing said means for controllably moving said milling head, said isolation wall having an aperture through which milling head protrudes into the milling cavity a third fan in the motor-control cavity; and an air conduit connecting an output of said third fan to said aperture to channel air from this fan through said aperture.

4. A mill as in claim 3 wherein said air conduit includes at said aperture a bellows that maintains physical connection between said isolation wall and said air conduit while allowing translation of the milling head through said aperture.

5. A mill as in claim 4 wherein said third fan is mounted on said Z-stage.

6. A mill comprising:

a milling head;

a cut motor, connected to the milling head to move said milling head in a manner that it will mill a workpiece with which it is brought into contact;

a workpiece support, adapted to hold said workpiece in a position and orientation such that said milling head can be brought into contact with a vertical surface of said workpiece to mill a controlled contour into said vertical surface of said workpiece;

means for controllably moving said milling head relative to said workpiece support to mill a controlled contour into said vertical surface of said workpiece; and an enclosure wall enclosing a volume containing at least said milling head and said workpiece support;

a pair of window shades, each having a roller axis oriented parallel to said isolation wall and parallel to the other of these two roller axes; and an aperture plate in which is formed said aperture, said aperture plate being attached to each of said pair of window shades such that, when this plate is translated in a Y-direction parallel to the isolation wall and perpendicular to the direction of these two axes, such translation will pull shade material off of one of these rollers and a torsion spring in the other of these two rollers will retract shade material onto that roller, thereby maintaining an isolation wall between the milling cavity and the motor/control cavity while enabling motion of the milling head in the Y-direction.

7. A mill as in claim 6 wherein said roller axes are both aligned in an X-direction that is substantially vertical.

8. A mill as in claim 7 further comprising:

a crossbar mounted at a top end of said pair of rollers and extending between these rollers;

said rollers being mounted on said means for controllably moving said milling head;

a drape connected between said crossbar and said enclosure wall, thereby enabling said isolation wall to be moved vertically when the milling head is moved vertically while maintaining a barrier that substantially blocks particulates from drifting from the milling cavity into the motor/control cavity.

9. A mill comprising:

a milling head;

a cut motor, connected to the milling head to move said milling head in a manner that it will mill a workpiece with which it is brought into contact;

a workpiece support, adapted to hold said workpiece in a position and orientation such that said milling head can be brought into contact with a vertical surface of said workpiece to mill a controlled contour into said vertical surface of said workpiece;

means for controllably moving said milling head relative to said workpiece support to mill a controlled contour into said vertical surface of said workpiece;

an enclosure wall enclosing a milling cavity containing at least said milling head and said workpiece support;

a particulate collection tray that includes at least one barrier that forces air flow through this tray into a nonlinear path, thereby producing an average flow path length, of air through this tray, that is longer than if such at least one barrier were not included; and means for producing a flow of air from the milling cavity into said particulate collection tray to carry particulates from the milling cavity into said particulate collection tray.

10. A mill as in claim 9 wherein said air flow through this tray passes through a first channel of width $W_1$ that is at least twice as large as a width $W_3$ of a third channel, of length comparable to a length of the first channel, through which this air passes after flowing through the first channel, whereby the flow velocity is no more than half as fast in the first channel as in the third channel, thereby enabling an increased fraction of particulates to settle out of this air flow within this first channel.

11. A mill as in claim 9 further comprising:

a filter at an exhaust end of the flow path through the particulate collection tray.

12. A mill as in claim 11 wherein said filter fits against a pair of side walls, a bottom wall and a back wall such that an enclosure is formed between all of these elements;

a plurality of exhaust openings in said back wall, whereby the air passing through this filter can spread out in this cavity before exiting through these exhaust openings, thus reducing the maximum velocity of flow through any of these openings and increasing the air pressure at these exhaust openings so that the tendency of particulates to be entrained by such flow is reduced.

* * * * *